United States Patent [19]

Koga et al.

[11] Patent Number: 5,589,297
[45] Date of Patent: *Dec. 31, 1996

[54] LITHIUM SECONDARY CELL

[75] Inventors: Keiji Koga; Hitoshi Arai; Tsuneo Kagotani; Yousuke Miyaki, all of Nagano, Japan

[73] Assignee: TDK Corporation, Tokyo, Japan

[*] Notice: The term of this patent shall not extend beyond the expiration date of Pat. No. 5,565,284.

[21] Appl. No.: 365,745

[22] Filed: Dec. 29, 1994

[30] Foreign Application Priority Data

Dec. 29, 1993 [JP] Japan ..................... 5-353671
Dec. 29, 1993 [JP] Japan ..................... 5-353672

[51] Int. Cl.$^6$ ..................................... H01M 4/36
[52] U.S. Cl. ................ 429/212; 429/194; 429/217; 429/218; 429/233; 429/245
[58] Field of Search ..................... 429/194, 212, 429/217, 218, 233, 245, 198

[56] References Cited

U.S. PATENT DOCUMENTS

| | | | |
|---|---|---|---|
| 4,157,317 | 6/1979 | Nagasawa et al. | |
| 5,284,722 | 2/1994 | Sugeno | 429/197 |
| 5,380,606 | 1/1995 | Itou et al. | 429/194 |
| 5,384,216 | 1/1995 | Teraoka et al. | 429/223 |
| 5,464,707 | 11/1995 | Moulton et al. | 429/212 |

FOREIGN PATENT DOCUMENTS

| | | |
|---|---|---|
| 0165795 | 12/1985 | European Pat. Off. . |
| 0561581 | 9/1993 | European Pat. Off. . |
| 0576686 | 1/1994 | European Pat. Off. . |
| 0620606 | 10/1994 | European Pat. Off. . |
| 0633618 | 1/1995 | European Pat. Off. . |
| 50-91719 | 7/1975 | Japan . |
| 61-77275 | 4/1986 | Japan . |
| 62-23433 | 5/1987 | Japan . |
| 62-186465 | 8/1987 | Japan . |
| 63-121260 | 5/1988 | Japan . |
| 63-59507 | 11/1988 | Japan . |
| 63-266774 | 11/1988 | Japan . |
| 2-148654 | 6/1990 | Japan . |
| 3-238770 | 10/1991 | Japan . |

OTHER PUBLICATIONS

Kamimura et al, "Li–Mn paper batteries and conductive compositions for them", Chemical Abstracts, vol. 118, No. 20, 17 May 1993, p. 203.

*Primary Examiner*—Maria Nuzzolillo
*Attorney, Agent, or Firm*—Oblon, Spivak, McClelland, Maier & Neustadt, P.C.

[57] ABSTRACT

A lithium secondary cell includes a negative electrode, a positive electrode, and a non-aqueous lithium-containing electrolyte solution. The negative and/or positive electrode includes a current collector, an underlying layer, and an electrode layer. The underlying layer is formed of a thermoset composition comprising carbon black, a thermosetting fluorinated polymer, and a crosslinking agent or a radiation-cured composition comprising carbon black, a radiation-curable polymer, and optionally a radiation-curable compound. The underlying layer is effective for maintaining firm adhesion between the current collector and the electrode layer during repetitive charge/discharge cycles.

10 Claims, 1 Drawing Sheet

LITHIUM SECONDARY CELL

TECHNICAL FIELD

This invention relates to a lithium secondary cell having a high energy density.

BACKGROUND OF THE INVENTION

Secondary batteries are often used as power supplies for driving portable electronic appliances or the like for the purpose of economy and resource saving and their use is remarkably expanding in these years. In accordance with size reduction and performance up-grade of electronic appliances, the batteries loaded therein are required to have a small size, light weight, and high capacity.

While lead-acid batteries and nickel-cadmium batteries are conventionally used as secondary batteries, non-aqueous lithium secondary batteries featuring a high energy density have been recently proposed and used in practice. Lithium secondary batteries using non-aqueous electrolytes, however, have the problem that they have a low current density as compared with conventional secondary batteries using aqueous solution because the electrolyte using a non-aqueous solvent as an ion-conducting medium has a lower ion-conducting rate.

Attempts were made to overcome such problems, for example, by increasing the surface area of electrodes to increase their contact area with the electrolyte. More particularly, an electrode coating composition containing an active material and a polymer binder is applied to a current collector in the form of a thin metal foil to form a thin electrode layer thereon and a plurality of such coated foils are placed one on another or spirally wound with a separator interleaved therebetween. For example, Japanese Patent Application Kokai (JP-A) No. 121260/1988 describes a lithium secondary cell using a nonaqueous electrolyte solution, $LiCoO_2$ and/or $LiNiO_2$ as a positive electrode, and carbon as a negative electrode. However, some problems arise when an electrode layer is formed on a current collector typically in the form of a metal foil. Repetition of charge-discharge cycles exacerbates the interfacial adhesion between the current collector and the electrode layer and lowers the discharge capacity of the electrodes, resulting in a short cycle life. Fine particles of the electrode layer shed from the current collector can cause short-circuits.

One of the probable causes is that as the active material and electrode layer are expanded and contracted by doping and dedoping of lithium ions upon charging and discharging, local shear stresses are developed at the electrode layer-current collector interface, exacerbating the interfacial adhesion. As a consequence, the internal resistance of the battery is increased to invite a capacity lowering and an interior temperature rise, resulting in a short battery life.

Proposals were made to prevent deterioration of the bond between an electrode layer and a current collector for increasing current collecting efficiency. For example, Japanese Patent Publication (JP-B) No. 186465/1987, JP-A 148654/1990, and JP-A 238770/1991 disclose non-aqueous electrolyte cells wherein an electrode layer and a current collector are separated by a conductive underlying layer containing silica as a binder and carbon black or nickel fine powder. These underlying layers are effective when applied to primary cells. Problems arise in secondary cells where charge/discharge cycles are repeated. Since the underlying layer using silica as a binder is less flexible, it fails to accommodate shear stresses developed at the electrode layer-current collector interface as a result of expansion and contraction of the electrode layer during charge/discharge cycles. This underlying layer fails to prevent deterioration of the bond between the electrode layer and the current collector after repeated charge/discharge cycles.

JP-A 266774/1988 discloses a flat contour organic electrolyte cell including a current collector in the form of an ethylenic resin film containing carbon black. A layer containing a polymer which is more flexible than the current collector and carbon black is formed on the current collector. This cell has the problem that upon repeated charge/discharge cycles, the binder polymer is degraded and leached into the organic electrolyte, losing adhesion.

Also JP-A 91719/1975 discloses a current collector having an underlying layer formed of a thermoset composition comprising chlorosulfonated polyethylene, tribasic lead maleate, and carbon black. Differently stated, the technique of using a polymer as a binder in an underlying layer and thermosetting the polymer is disclosed. However, the polymer used in the underlying layer is chlorosulfonated polyethylene, which cannot achieve satisfactory properties after thermosetting because of inclusion of chlorine. There remains a problem that as charge/discharge cycles are repeated, the binder is degraded, resulting in a substantial loss of discharge capacity.

SUMMARY OF THE INVENTION

A primary object of the present invention is to provide a lithium secondary cell having an electrode which experiences minimized deterioration of the adhesion between a current collector and an electrode layer upon repetition of charge/discharge cycles and which ensures high capacity charge/discharge operation at an increased current density and minimizes capacity lowering after repeated charge/discharge cycles.

The present invention is directed to a lithium secondary cell comprising a negative electrode, a positive electrode, and a non-aqueous electrolyte solution containing a lithium-bearing electrolyte. The negative electrode and/or positive electrode includes an electrode layer disposed on a current collector through an underlying layer.

In a first embodiment, the underlying layer is formed of a composition comprising carbon black, a thermosetting polymer containing a fluorinated polymer, and a crosslinking agent, the composition being thermoset. Preferably the composition of the underlying layer contains 100 parts by weight of the thermosetting polymer, about 10 to 200 parts by weight of carbon black, about 1 to 10 parts by weight of the crosslinking agent, and optionally about 1 to 15 parts by weight of an acid acceptor.

In a second embodiment, the underlying layer is formed of a composition comprising carbon black and a radiation-curable polymer, the composition being radiation cured. Preferably the radiation-curable polymer in the underlying layer is a fluorinated resin. Preferably the composition of the underlying layer further includes a radiation-curable compound containing at least two groups each having a radiation-sensitive unsaturated double bond. The group having a double bond is typically a substituted or unsubstituted allyl or acryloyl group. Preferably the composition of the underlying layer contains 100 parts by weight of the radiation-curable polymer, about 0.1 to 50 parts by weight of the radiation-curable compound, and about 10 to 200 parts by weight of carbon black.

In either embodiment, the carbon black in the underlying layer preferably has a DBP oil absorption of 100 to 500 cc/100 g. The underlying layer has a preferred thickness of 0.1 to 20 μm.

As mentioned above, the electrode according to the present invention has an underlying layer interposed between an electrode layer and a current collector. The underlying layer is manufactured of (A) a thermoset composition comprising carbon black, a thermosetting fluorinated polymer, and a crosslinking agent, or (B) a radiation-cured composition comprising carbon black and a radiation-curable polymer. The intervening or underlying layer is effective for improving the adhesion between the electrode layer and the current collector. Because of the composition, the underlying layer is flexible enough to accommodate shear stresses developed at the electrode layer-current collector interface as a result of expansion and contraction of the electrode layer during charge/discharge cycles, preventing any deterioration of the adhesion between the electrode layer and the current collector. In the first embodiment wherein the underlying layer is formed by curing a polymer composition containing a fluorinated polymer, the underlying layer is well resistant to chemicals and avoids decomposition of the resin layer at the interface with the current collector by repeated charge/discharge cycles and leaching of the resin into the organic electrolyte solution. Therefore the lithium secondary cell of the invention experiences minimized deterioration of the adhesion between a current collector and an electrode layer upon repetition of charge/discharge operation. The cell has a high capacity and is reliable in that there occurs a minimal capacity loss after repeated charge/discharge cycles.

BRIEF DESCRIPTION OF THE DRAWINGS

The features and functions of the present invention, as well as the advantages derived therefrom, will become apparent from the subsequent detailed description of preferred embodiments when taken in conjunction with the accompanying drawings.

DESCRIPTION OF THE PREFERRED EMBODIMENTS

The lithium secondary cell of the present invention includes a negative electrode, a positive electrode, and a non-aqueous electrolyte solution containing a lithium-bearing electrolyte in a non-aqueous solvent. Either one or both of the negative and positive electrodes include an electrode layer disposed on a current collector through an underlying layer.

Figure 1:
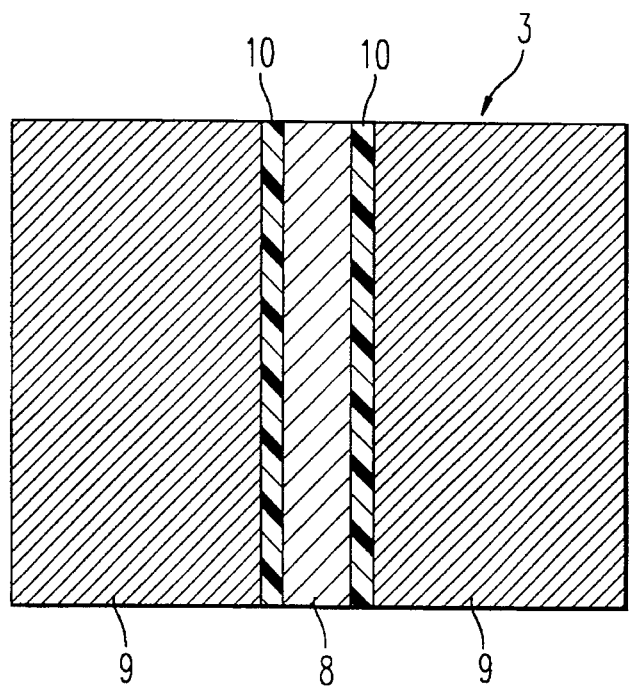
FIG. 1 is a schematic cross-sectional view of an electrode used in a lithium secondary cell according to the present invention.

Referring to FIG. 1, there is schematically illustrated an electrode 3 which constitutes a negative and/or positive electrode. The electrode 3 includes a current collector 8, an electrode layer 9, and an underlying layer 10. The underlying layer 10 intervenes between the current collector 8 and the electrode layer 9. In the illustrated embodiment, the underlying layer 10 and the electrode layer are formed on either surface of the current collector 8. It is envisioned within the scope of the invention that the underlying layer 10 and the electrode layer are formed on only one of the major surfaces of the current collector 8. In the first embodiment, the underlying layer 10 is manufactured of (A) a thermoset composition comprising carbon black, a thermosetting polymer, and a crosslinking agent (to be referred to as underlying layer A, hereinafter). In the second embodiment, the underlying layer 10 is manufactured of (B) a radiation-cured composition comprising carbon black and a radiation-curable polymer (to be referred to as underlying layer B, hereinafter).

Underlying Layer

The underling layers A and B are illustrated in detail by first describing materials specifically used in the respective layers and subsequently describing common materials.

Underlying Layer A

The composition of which underlying layer A is made contains a thermosetting polymer, preferably a thermosetting fluorinated polymer containing a fluorine atom or atoms in its molecule. Examples of the fluorinated polymer include polychlorotrifluoroethylene (PCTFE), polyvinylidene fluoride (PVDF), vinylidene fluoride-hexafluoropropylene copolymers, polyvinyl fluoride (PVF), vinylidene fluoride-hexafluoropropylene fluoro-rubber, vinylidene fluoride-tetrafluoroethylene fluoro-rubber, tetrafluoroethylene-perfluoroalkyl vinyl ether fluoro-rubbers, vinylidene fluoride-tetrafluoro-ethylene-hexafluoropropylene fluoro-rubber, vinylidene fluoride-tetrafluoroethylene-perfluoroalkyl vinyl ether fluoro-rubbers, tetrafluoroethylene-perfluoroalkyl vinyl ether fluoro-rubbers, propylene-tetrafluoroethylene fluoro-rubbers, fluoro-silicone rubber, fluorinated phosphazene rubber, and fluorinated rubbers, alone or in admixture of two or more. These polymers preferably have a molecular weight of about 5,000 to about 100,000,000. The polymers can be thermoset with crosslinking agents to be described below.

Any of well-known crosslinking agents may be used. Examples include polyamines such as hexamethylenediamine carbamate, N,N'-dicinnamylidene-1,6-hexanediamine, and 4,4'-methylene-bis(cyclohexylamine)carbamate; polyols such as bisphenol AF or 2,2-bis(4-hydroxyphenyl)hexafluoropropane and bisphenol A or 2,2-bis(4-hydroxyphenyl)propane; peroxides such as 2,5-dimethyl-2,5-di-t-butylperoxyhexane and 1,3-bis(t-butylperoxyisopropyl)benzene, optionally combined with crosslinking aids such as triallyl isocyanurate; and triazine dithiols such as 6-dibutylamyl-1,3,5-triazine-2,4-dithiol.

Preferably the crosslinking agent is used in amounts of about 1 to about 10 parts by weight per 100 parts by weight of the thermosetting polymer. On this basis, less than 1 part of the crosslinking agent would be too small for the polymer to reach a high crosslinking density, resulting in an underlying layer having poor adhesion and chemical instability. A coating composition containing more than 10 parts of the crosslinking agent would be low shelf stable and thus difficult to form an underlying layer as a thin layer.

The composition of the underlying layer may further include another polymer such as polymethyl methacrylate (PMMA) and polycarbonate (PC), preferably in amounts of less than about 50 parts by weight per 100 parts by weight of the fluorinated polymer.

Underlying Layer B

The composition of which underlying layer B is made contains a polymer which is cured by radiation-assisted crosslinking after it is coated to form a layer. If a polymer is previously crosslinked prior to layer formation, it is difficult to form a layer which is uniform, free of pinholes, and firmly bound to the current collector. If the composition of the underlying layer is not subject to radiation curing, the layer-forming resin is less resistant to chemicals and likely to be degraded and leached into the electrolyte solution during repeated charge/discharge cycles, resulting in a low cell capacity.

Any radiation-curable polymer may be used in underlying layer B. It may be selected from thermoplastic resins and thermosetting resins which are radiation curable. Exemplary polymers include polyolefin resins, polyester resins, polyamide resins, epoxy resins, and acrylic resins. Especially useful are fluorinated resins containing a fluorine atom or atoms in a molecule. Exemplary fluorinated resins include (1) resins such as polytetrafluoroethylene, modified polytetrafluoroethylene, polyhexafluoropropylene, tetrafluoroethylene-hexafluoropropylene copolymers, tetrafluoroethylene-perfluoroalkyl vinyl ether copolymers, polytrifluoroethylene, ethylene-tetrafluoroethylene copolymers, fluoroethylene-hydrocarbon vinyl ether copolymers, poly-chlorotrifluoroethylene, ethylene-chlorotrifluoroethylene copolymers, polyvinyl fluoride, polyvinylidene fluoride, vinylidene fluoride-hexafluoropropylene copolymers, fluorinated (meth)acrylate resins, 2-fluoroacrylate resins, fluorinated epoxy resins, fluorinated epoxy (meth)acrylate resins, fluorinated polyether resins, fluorinated polyimide resins, fluorinated polyester resins, fluorinated polyamide resins, fluorinated polycarbonate resins, fluorinated polyformal resins, fluorinated polyketone resins, fluorinated polyazomethine resins, fluorinated polyazole resins, and fluorinated polyallyloxysilane resins; and (2) elastomers such as vinylidene fluoride-hexafluoropropylene fluoroelastomers, vinylidene fluoride-tetrafluoroethylene fluoroelastomers, tetrafluoroethylene-perfluoroalkyl vinyl ether fluoroelastomers, vinylidene fluoride-tetrafluoroethylene-hexafluoropropylene fluoroelastomers, vinylidene fluoride-tetrafluoroethylene-perfluoroalkyl vinyl ether fluoroelastomers, tetrafluoroethylene-perfluoroalkyl vinyl ether fluoroelastomers, propylene-tetrafluoroethylene fluoroelastomers, fluorosilicone rubbers, fluorinated phosphazene rubbers, fluorinated thermoplastic rubbers, and flexible fluorocarbon resins; alone and mixtures thereof, although the invention is not limited thereto.

While the fluorinated polymers mentioned above have radiation curing ability by themselves, they may be modified for enhancing their radiation curing ability by introducing a radiation curable group at a molecular end or a molecular side chain. The radiation curable groups to be introduced into the fluorinated polymers are preferably groups containing about 2 to 10,000 unsaturated double bonds such as allyl and acryloyl per molecule.

The fluorinated polymers are not limited in molecular weight although they preferably have a weight average molecular weight Mw of about 5,000 to about 100,000,000. With a molecular weight of less than 5,000, the underlying layer would become too low in strength to prevent interfacial separation from the current collector due to expansion and contraction of the electrode layer during charge/discharge cycles. A molecular weight of more than 100,000,000 would make it difficult to coat the underlying layer composition as a thin layer.

For radiation curing to take place more effectively, the composition should further contain a radiation-curable compound having at least two, typically 2 to 12, groups each having a radiation-sensitive unsaturated double bond. Inclusion of such a radiation-curable compound allows curing to take place with a low dose of electron radiation, leading to a saving of the curing cost. It is also effective for further improving the adhesion between the current collector and the electrode layer and chemical resistance.

One exemplary group having an unsaturated double bond is an allyl group of the formula:

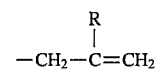

wherein R is hydrogen or fluorine.

Another exemplary group having an unsaturated double bond is an acryloyl group of the formula:

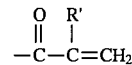

wherein R' is hydrogen, fluorine, an alkyl group (typically methyl) or a fluoroalkyl group (typically trifluoromethyl).

Preferred, non-limiting examples of the radiation-curable compound used herein include allyl group-containing compounds such as diallyl sebacate, diallyl phthalate, triallyl trimellitate, triallyl trimesate, triallyl cyanurate, and triallyl isocyanurate;

acrylates such as ethylene glycol diacrylate, diethylene glycol diacrylate, triethylene glycol diacrylate, polyethylene glycol diacrylate, tripropylene glycol diacrylate, 1,3-butylene glycol diacrylate, 1,4-butane diol diacrylate, 1,5-pentane diol diacrylate, neopentyl glycol diacrylate, hydroxypivalic acid neopentyl glycol ester diacrylate, 1,6-hexanediol acrylate, tripropylene glycol diacrylate, trimethylol propane triacrylate, trimethylol propane-alkylene oxide adduct triacrylate, glycerin-alkylene oxide adduct triacrylate, pentaerythritol triacrylate, pentaerythritol tetraacrylate, dipentaerythritol pentaacrylate, dipentaerythritol hexaacrylate, bisphenol A- alkylene oxide adduct diacrylate, trisacryloxyethyl phosphate, bisacryloyloxyethyl-hydroxyethyl isocyanurate, trisacryloyloxyethyl isocyanurate, oligo-ester acrylate, epoxyacrylate, and urethane acrylate;

methacrylates such as ethylene glycol dimethacrylate, diethylene glycol dimethacrylate, triethylene glycol dimethacrylate, polyethylene glycol dimethacrylate, tripropylene glycol dimethacrylate, 1,3-butylene glycol dimethacrylate, 1,4-butanediol dimethacrylate, 1,5-pentanediol dimethacrylate, neopentyl glycol dimethacrylate, hydroxypivalic acid neopentyl glycol ester dimethacrylate, 1,6-hexanediol methacrylate, tripropylene glycol dimethacrylate, trimethylolpropane trimethacrylate, trimethylol propane-alkylene oxide adduct trimethacrylate, glycerin-alkylene oxide adduct trimethacrylate, pentaerythritol trimethacrylate, pentaerythritol tetramethacrylate, dipentaerythritol pentamethacrylate, dipentaerythritol hexamethacrylate, bisphenol A-alkylene oxide adduct dimethacrylate, trismethacryloxyethyl phosphate, bismethacryloyloxyethyl hydroxyethyl isocyanurate, trismethacryloyloxyethyl isocyanurate, oligo-ester methacrylate, epoxy methacrylate, and urethane methacrylate; and fluoroacrylates such as ethylene glycol di-2-fluoroacrylate, diethylene glycol di-2-fluoroacrylate, triethylene glycol di-2-fluoroacrylate, polyethylene glycol di-2-fluoroacrylate, tripropylene glycol di-2-fluoroacrylate, 1,3-butylene glycol di-2-fluoroacrylate, 1,4-butadienediol di-2-fluoroacrylate, 1,5-pentanediol di-2-fluoroacrylate, neopentyl glycol di-2-fluoroacrylate, hydroxypyvalic acid neopentyl glycol ester di-2-fluoroacrylate, 1,6-hexanediol 2-fluoroacrylate, tripropylene glycol di-2-fluoroacrylate, trimethylolpropane tri-2-fluoroacrylate, trimethylolpropane-alkylene oxide adduct tri-2-fluoroacrylate, pentaerythritol tri-2-fluoroacrylate, pentaerythritol tetra-2-fluoroacrylate, dipentaerythritol penta-2-fluoroacrylate, dipentaerythritol hexa-2-fluoroacrylate, bisphenol A-alkylene oxide adduct di-2-fluoroacrylate, tris-2-fluoroacryloxyethyl phosphate, bis-2-fluoroacryloyloxyethyl hydroxyethyl isocyanurate, tris-2-fluoroacryloyloxyethyl isocyanurate, oligo-ester-2-fluoroacrylate, epoxy-2-fluoroacrylate, and urethane-2-fluoroacrylate, alone and in admixture.

The radiation-curable compound is preferably present in an amount of about 0.1 to 50 parts, especially 1 to 20 parts by weight per 100 parts by weight of the polymer. Less than 0.1 part by weight of radiation-curable compound is meaningless for its purpose of further curing improvement. With more than 50 parts by weight of radiation-curable compound, the underlying layer would be rather reduced in mechanical strength and an improvement in charge/discharge cycle life be unsatisfactory.

After formation as a film, the composition of underlying layer B is subject to radiation curing treatment. Radiation curing treatment may also be effected after both the underlying layer and electrode layer are formed. The underlying layer which has been radiation cured is significantly improved in stability against charge/discharge operation and chemical resistance. The curing treatment may be done in accordance with various well-known procedures.

Where electron beams are used in the curing treatment, it is convenient to use a radiation accelerator having an accelerating voltage of 100 to 750 kV, preferably 150 to 300 kV and to provide radiation at an absorption dose of 1 to 100 megarad. The atmosphere for electron beam exposure is preferably an inert gas atmosphere, especially a nitrogen atmosphere.

Where ultraviolet radiation is used in the curing treatment, a photo-polymerization sensitizer is preferably added to the composition comprising a radiation-curable polymer, typically a radiation-curable fluorocarbon resin and an optional radiation-curable compound. The photo-polymerization sensitizer may be selected from conventional well-known ones, for example, benzoins such as benzoin methyl ether, benzoin ethyl ether, and α-methylbenzoin, ketones such as benzophenone, acetophenone, and bisdialkylaminobenzophenone, quinones such as anthraquinone and phenanthraquinone, and sulfides such as benzidyl sulfide and tetramethylthiuram monosulfide. The content of photopolymerization sensitizer is preferably about 0.01 to about 10 parts by weight per 100 parts by weight of the polymer. For ultraviolet irradiation, UV lamps such as xenon discharge lamps and deuterium discharge lamps may be used.

Remaining Components

The composition of which underlying layer A or B is made may contain any desired additive, for example, an acid acceptor. The acid acceptor is selected from well-known ones, for example, magnesium oxide and calcium hydroxide. The content of acid acceptor is preferably about 1 to 15 parts by weight per 100 parts by weight of the polymer.

Carbon black is essentially contained in the composition of which underlying layer A or B is made. The preferred carbon black is conductive carbon black of a large structure having a developed linkage of primary particles. The structure of carbon black is generally represented by a dibutyl phthalate (DBP) oil absorption. The preferred carbon black has a DBP oil absorption of about 100 to 500 cc/100 g as measured by JIS K-6221, Procedure A. If carbon black has a DBP oil absorption of less than 100 cc/100 g, the underlying layer would be less conductive, sometimes resulting in an electrode having an increased internal resistance and a reduced discharge capacity. If carbon black has a DBP oil absorption of more than 500 cc/100 g, the underlying layer would become poor in flexibility and adhesion, sometimes failing to accommodate shear stresses developed by expansion and contraction of the electrode layer during charge/discharge cycles and resulting in a reduced discharge capacity.

No limit is imposed on the type of carbon black although furnace black, acetylene black and Ketjen Black are suitable. Also no particular limit is imposed on the content of carbon black in the underlying layer composition although it is favorable to use about 10 to about 200 parts by weight of carbon black per 100 parts by weight of the polymer. On this basis, less than 10 parts of carbon black would form a less conductive underlying layer, resulting in a reduced cell capacity. An underlying layer containing more than 200 parts of carbon black would be reduced in strength and adhesion and fail to accommodate shear stresses developed by expansion and contraction of the electrode layer during charge/discharge cycles, resulting in a reduced discharge capacity.

Preferably the underlying layer has a thickness of 0.1 to 20 μm, more preferably 0.5 to 10 μm though not limited thereto. Layers of less than 0.1 μm thick would be difficult to avoid film defects such as pinholes. Layers of more than 20 μm thick would adversely affect electric conduction between the electrode layer and the current collector, resulting in a reduced cell capacity.

Construction of Secondary Cell

In the lithium secondary cell of the invention, the negative electrode active material which is not critical may be any of carbonaceous materials and conductive polymers which allow for intercalation or doping of lithium ions, or metallic lithium and lithium alloys. The carbonaceous material may be suitably selected from graphite, carbon black, mesophase carbon black, resin-fired carbon materials, gas phase grown carbon fibers, and carbon fibers, with those described in JP-B 23433/1987 and JP-A137010/1991, for example, being useful. The conductive polymer may be selected from polyacetylene, polyphenylene, and polyacene, with those described in JP-A 77275/1986 being useful.

The positive electrode active material which is not critical includes metal compounds, metal oxides, metal sulfides, carbon materials, and conductive polymers which allow for intercalation or doping of lithium ions, for example, such as $LiCoO_2$, $LiNiO_2$, $LiMnO_2$, $Li_2Mn_2O_4$, $V_2O_5$, $TiS_2$, $MoS_2$, $FeS_2$, polyacetylene, polyaniline, polypyrrole, polythiophene, and polyacene, as well as those described in JP-B 53828/1086 and 59507/1988. Where metal oxides and metal sulfides are used as the positive electrode active material, it is preferred to add carbon materials including carbon black such as acetylene black and Ketjen Black and graphite as a conductive agent.

In preparing the electrodes for use in the lithium secondary cell of the invention, a coating composition for the underlying layer is first coated to a surface of a current collector.

No particular limit is imposed on the material and shape of the current collector. Any of metals and alloys such as aluminum, copper, nickel, titanium and stainless steel may be used in web shape, for example, foil, perforated foil and mesh shape.

The coating composition for underlying layer A is prepared by mixing and dispersing a thermosetting polymer, a crosslinking agent, carbon black and additives together with a solvent, if desired, in a dispersion device such as an agitator, ball mill, super-sand mill, pressure kneader or the like. The coating composition for underlying layer B can be similarly prepared. The solvent used in the coating composition is not critical and may be selected for a particular purpose from well-known solvents, for example, water, methyl ethyl ketone, cyclohexanone, isophoron, N-methylpyrrolidone, N,N-dimethylformamide, N,N-dimethylacetamide, and toluene.

The coating composition is coated to a web-shaped current collector. The coating method which is not critical may be selected from well-known methods including electrostatic coating, dip coating, spray coating, roll coating, doctor blade, gravure coating, and screen printing methods. The coating is then subject to curing treatment in a curing unit. It is understood that curing treatment may be postponed until an electrode layer is formed on the underlying layer.

In the thermosetting embodiment, heat curing treatment may be in accord with any well-known technique using any suitable oven such as far-infrared ovens, electric ovens, vacuum ovens, and inert gas-purged ovens. In the radiation curing embodiment, an electron beam irradiating device or ultraviolet light irradiating device may be used.

After the underlying layer is formed on the current collector, an electrode layer is formed thereon. An electrode coating composition is prepared, for example, by mixing and dispersing an active material, binder resin, and various additives optionally with a solvent in a dispersion device such as an agitator, ball mill, super-sand mill, pressure kneader or the like.

No particular limit is imposed on the binder resin used in the electrode layer although it is generally selected from thermoplastic resins, thermosetting resins, and radiation-curable resins. Exemplary polymers include polyolefin resins, polyester resins, polyamide resins, epoxy resins, and acrylic resins. Especially useful are fluorinated resins containing a fluorine atom or atoms in a molecule. Exemplary fluorinated resins include polytetrafluoroethylene (PTFE), ethylene-tetrafluoroethylene copolymers (ETFE), tetrafluoroethylene-hexafluoropropylene copolymers (FEP), tetrafluoroethylene-perfluoroalkyl vinyl ether copolymers (PFA), poly-chlorotrifluoroethylene (PCTFE), polyvinylidene fluoride (PVDF), vinylidene fluoride-hexafluoropropylene copolymers, polyvinyl fluoride (PVF), vinylidene fluoride fluoroelastomers, propylene-tetrafluoroethylene fluoroelastomers, tetrafluoro-ethylene-perfluoroalkyl vinyl ether fluoroelastomers, fluorinated acrylic resins, and fluorinated polycarbonate resins, alone and mixtures thereof, although the invention is not limited thereto.

In the embodiment of underlying layer B, that is, an underlying layer of a radiation-curable polymer composition, the binder resin of the electrode layer is preferably selected from those resins previously exemplified as the polymer in the underlying layer B composition, depending on a particular purpose.

The electrode coating composition is coated to the undercoated current collector. The coating method which is not critical may be selected from well-known methods including electrostatic coating, dip coating, spray coating, roll coating, doctor blade, gravure coating, and screen printing methods. The coating is then subject to rolling treatment by means of a plate press or calender roll, if necessary. The electrode layer may be subject to curing treatment. Since it is acceptable to cure the underlying layer after the electrode layer is formed, both the underlying layer and the electrode layer may be subject to common curing treatment if they can be cured by the same process.

The electrolyte solution used in the secondary cell of the invention is preferably a non-aqueous electrolyte solution containing a lithium-containing electrolyte in a non-aqueous solvent. The lithium-containing electrolyte which is not critical may be suitably selected from $LiPF_6$, $LiBF_4$, $LiClO_4$, $LiAsF_6$, and $LiCF_3SO_3$, for example. The non-aqueous solvent which is not critical may be selected from, for example, dimethyl sulfoxide, sulfolane, ethylene carbonate, propylene carbonate, Y-butyrolactone, Y-valerolactone, Y-octanoic lactone, 1,2-diethoxyethane, 1,2-dimethoxyethane, 1,2-dibutoxyethane, 1,3-dioxolan, tetrahydrofuran, 2-methyltetrahydrofuran, alone and mixtures thereof. The amount of the electrolyte dissolved in the non-aqueous solvent is preferably about 0.1 to 2 mol/liter though not critical.

The structure of the lithium secondary cell of the invention, which is not particularly limited, generally includes a positive electrode, a negative electrode and optionally a separator and may take the form of a paper, button, laminate or roll type battery.

EXAMPLE

Examples of the invention are given below by way of illustration. All parts are by weight.

EXAMPLES 1-4

An underlying layer coating composition was prepared from the following components.

| Underlying layer coating composition | pbw |
|---|---|
| Carbon black (see Table 1) | 100 |
| Thermosetting polymer (Viton A*) | 100 |
| Crosslinking agent (see Table 1) | 3 |
| MgO (Kyowa-Mag #30 by Kyowa Chemical K.K.) | 15 |
| N-methylpyrrolidone | 2000 |

*Viton A is a vinylidene fluoride-hexafluoropropylene fluoro-rubber commercially available from Showa Denko-duPont K.K.

The ingredients were mixed and dispersed in a ball mill for 10 hours, obtaining the underlying layer coating composition. The coating composition was then coated to each surface of a copper foil web of 12 μm thick by a doctor blade technique and dried with hot air to form an undercoat layer of 3 μm thick on each surface of the copper foil.

An electrode coating composition was prepared from the following components.

| Electrode coating composition | pbw |
|---|---|
| Active material, graphite (KS44 by Lonza G&T Ltd.) | 100 |
| Binder resin (Hylar 720*) | 8 |
| N-methylpyrrolidone | 180 |

*Hylar 720 is a polyvinylidene fluoride commercially available from Ausimont USA Inc.

The ingredients were mixed and dispersed in a ball mill for 10 hours, obtaining the electrode coating composition. The coating composition was then coated to each surface of the undercoated copper foil web by a doctor blade technique and dried with hot air to form an electrode layer of 100 μm

TABLE 1

| Electrode | | Crosslinking | Discharge capacity (mAh/g) after | | | | |
|---|---|---|---|---|---|---|---|
| sample | Carbon black | agent | 1 | 5 | 10 | 15 | 20 cycles |
| E1 | A | acetylene black HS100 | Diac No. 1 | 307 | 295 | 268 | 251 | 249 |
| E2 | B | Ketjen black EC | Diac No. 1 | 305 | 283 | 257 | 243 | 239 |
| E3 | C | acetylene black HS100 | Bisphenol AF | 299 | 286 | 288 | 275 | 275 |
| E4 | D | Ketjen black EC | Bisphenol AF | 287 | 282 | 282 | 280 | 277 |
| CE1 | E | — | — | 304 | 261 | 232 | 191 | 165 |
| CE2 | F | acetylene black HS100 | — | 271 | 156 | 113 | 0 | 0 |

Acetylene black HS100 has a DBP oil absorption of 130 cc/100 g and is commercially available from Denki Kagaku K.K.
Ketjen black EC has a DBP oil absorption of 300 cc/100 g and is commercially available from Lion Yusi K.K.
Diac No. 1 is a polyamine commercially available from Showa Denko-duPont K.K.
Bisphenol AF is commercially available from PRC K.K.

thick on each surface of the copper foil. Thereafter, the coated foil was subject to heat curing treatment in a nitrogen-purged oven at 200° C. for 24 hours.

The thus coated foil was cut to a piece of 25 mm by 20 mm. The electrode layer was removed over a width of 5 mm along one short side, leaving the electrode layer of 20 mm by 20 mm. A titanium wire as a lead was spot welded to the exposed portion of the foil where the electrode layer was removed. In thus way, electrode samples designated A, B, C and D were obtained (see Table 1).

Using these electrode samples as a working electrode, test cells were constructed with which a charge/discharge test was carried out as follows. The counter electrode and reference electrode were lithium plates connected to titanium wires. The electrolyte solution used was a solvent mixture of ethylene carbonate and diethyl carbonate in a volume ratio of 1:1 in which 1 M of lithium perchlorate was dissolved. Charge/discharge operation was effected at a constant current flow of 4 mA over the range of from 0 to 1 volt versus $Li/Li^+$. The discharge capacity was determined at the end of 1, 5, 10, 15 and 20 charge/discharge cycles. The results are shown in Table 1.

Figure 2:
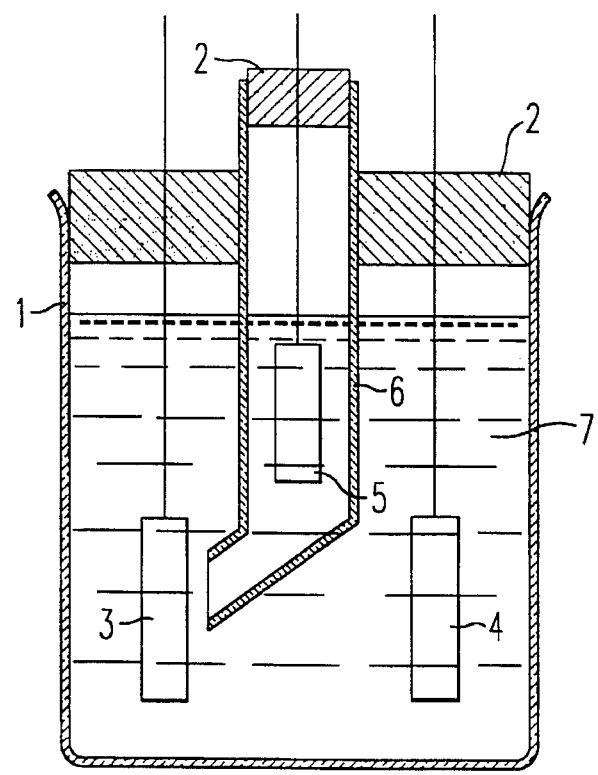
FIG. 2 is a schematic cross-sectional view of a test cell for examining charge/discharge performance.

FIG. 2 is a cross-sectional view of a test cell constructed for the measurement of charge/discharge performance. Illustrated are a glass beaker 1 of 100 $cm^3$, silicone plugs 2, a working electrode 3 which is the electrode sample, a counter electrode 4, a reference electrode 5, a Haber-Luggin capillary 8, and an electrolyte solution 7.

COMPARATIVE EXAMPLE 1

An electrode sample designated E was fabricated by the same procedure as in Example 1 except that the underlying layer was omitted. Using this electrode sample, a test cell was similarly constructed.

COMPARATIVE EXAMPLE 2

An electrode sample designated F was fabricated by the same procedure as in Example 1 except that the polymer in the underlying layer coating composition was replaced by a thermoplastic resin Hylar 2800, a vinylidene fluoride-hexafluoropropylene copolymer commercially available from Ausimont USA Inc.. Using this electrode sample, a test cell was similarly constructed.

The test cells of Comparative Examples 1 and 2 were also operated to examine charge/discharge performance. The results are shown in Table 1.

As seen from Table 1, the cells of Examples 1 to 4 using electrode samples A, B, C and D within the scope of the present invention experienced a minimal loss of discharge capacity upon repetition of charge/discharge cycles. A comparison of the discharge capacity at the end of 20 charge/discharge cycles in Table 1, for example, reveals that the cells of Examples 1 to 4 using electrode samples A, B, C and D maintained a significantly improved discharge capacity over the cells of Comparative Examples 1 and 2, indicating an improved cycle life.

EXAMPLES 5 & 6

An underlying layer coating composition was prepared from the following components as in Example 1.

| Underlying layer coating composition | pbw |
|---|---|
| Carbon black (see Table 2) | 100 |
| Polymer (Hylar 2800*) | 100 |
| N-methylpyrrolidone | 2000 |

*Hylar 2800 is a vinylidene fluoride-hexafluoropropylene copolymer commercially available from Ausimont USA Inc..

The ingredients were mixed and dispersed in a ball mill for 10 hours, obtaining the underlying layer coating composition. The coating composition was then coated to each surface of a copper foil web of 12 μm thick by a doctor blade technique and dried with hot air to form an undercoat layer of 3 μm thick on each surface of the copper foil.

An electrode coating composition was prepared from the following components.

| Electrode coating composition | pbw |
|---|---|
| Active material, graphite (KS44 by Lonza G&T Ltd.) | 100 |
| Binder resin (Hylar 720, polyvinylidene fluoride by Ausimont USA Inc.) | 8 |
| N-methylpyrrolidone | 180 |

The ingredients were mixed and dispersed in a ball mill for 10 hours, obtaining the electrode coating composition. The coating composition was then coated to each surface of the undercoated copper foil web by a doctor blade technique and dried with hot air to form an electrode layer of 100 μm thick on each surface of the copper foil.

Using an area beam type electron beam accelerator manufactured by Nisshin High Voltage K.K., the current collector having the underlying and electrode layers coated thereon were exposed on both the surfaces to electron radiation in a nitrogen atmosphere under conditions: accelerating voltage 150 keV, electrode current 20 mA, and dose 48 Mrad. The coatings were cured with electron radiation.

The thus coated foil was cut to a piece of 25 mm by 20 mm. The electrode layer was removed over a width of 5 mm along one short side, leaving the electrode layer of 20 mm by 20 mm. A titanium wire as a lead was spot welded to the exposed portion of the foil. In this way, electrode samples designated G and H were obtained (see Table 2).

Using these electrode samples as a working electrode, test cells of the structure shown in FIG. 2 were constructed as in Example 1. The test cells of Examples 5 and 6 were subject to a charge/discharge test under the same conditions as in Example 1. The discharge capacity was determined at the end of 1, 5, 10, 15 and 20 charge/discharge cycles The results are shown in Table 2.

EXAMPLES 7–9

An underlying layer coating composition was prepared from the following components as in Example 5.

| Underlying layer coating composition | pbw |
|---|---|
| Carbon black (see Table 2) | 100 |
| Polymer (Hylar 2800) | 100 |
| Radiation-curable compound (see Table 2) | 10 |
| N-methylpyrrolidone | 2000 |

As in Example 5, the coating composition was then coated to each surface of a copper foil web, forming an undercoat layer.

As in Example 5, an electrode layer was formed on each surface of the undercoated copper foil.

Using an area beam type electron beam accelerator manufactured by Nisshin High Voltage K.K., the current collector having the underlying and electrode layers coated thereon were exposed on both the surfaces to electron radiation in a nitrogen atmosphere under conditions: accelerating voltage 150 keV, electrode current 20 mA, and dose 20 Mrad. The coatings were cured with electron radiation.

As in Example 5, electrode samples designated I, J and K were obtained (see Table 2). Using these electrode samples as a working electrode, test cells of Examples 7, 8 and 9 were constructed and tested. The results are shown in Table 2.

EXAMPLES 10 AND 11

An underlying layer coating composition was prepared from the following components as in Example 5.

| Underlying layer coating composition | pbw |
|---|---|
| Carbon black (see Table 2) | 100 |
| Polymer (Viton A*) | 100 |
| Radiation-curable compound (see Table 2) | 10 |
| N-methylpyrrolidone | 2000 |

*Viton A is a vinylidene fluoride-hexafluoropropylene fluoro-rubber commercially available from Showa Denko-duPont K.K.

As in Example 5, the coating composition was then coated to each surface of a copper foil web, forming an undercoat layer. As in Example 5, an electrode layer was formed on each surface of the undercoated copper foil.

Using an area beam type electron beam accelerator manufactured by Nisshin High Voltage K.K., the current collector having the underlying and electrode layers coated thereon were exposed on both the surfaces to electron radiation in a nitrogen atmosphere under conditions: accelerating voltage 150 keV, electrode current 20 mA, and dose 20 Mrad. The coatings were cured with electron radiation.

As in Example 5, electrode samples designated L and M were obtained (see Table 2). Using these electrode samples as a working electrode, test cells of Examples 10 and 11 were constructed and tested. The results are shown in Table 2.

COMPARATIVE EXAMPLES 3 AND 4

Electrode samples N and P were prepared by the same procedure as in Examples 5 and 10 except that the underlying layers were not subject to radiation curing treatment. Using these electrode samples as a working electrode, test cells of Comparative Examples 3 and 4 were constructed and tested. The results are shown in Table 2.

The results of Comparative Example 1 wherein the current collector had no underlying layer are also shown in Table 2.

TABLE 2

| | Electrode sample | Carbon black | Radiation-curable compound | Discharge capacity (mAh/g) after | | | | |
|---|---|---|---|---|---|---|---|---|
| | | | | 1 | 5 | 10 | 15 | 20 cycles |
| E5 | G | acetylene black HS100 | — | 301 | 299 | 278 | 265 | 263 |
| E6 | H | Ketjen black EC | — | 298 | 283 | 261 | 255 | 253 |
| E7 | I | acetylene black HS100 | triallylcyanurate | 306 | 307 | 303 | 301 | 300 |
| E8 | J | acetylene black HS100 | Aronix M309 | 310 | 302 | 303 | 305 | 297 |
| E9 | K | acetylene black HS100 | triallyl trimesate | 316 | 308 | 307 | 305 | 306 |
| E10 | L | acetylene black HS100 | triallyl cyanurate | 308 | 299 | 283 | 278 | 275 |
| E11 | M | Ketjen black EC | triallyl cyanurate | 306 | 308 | 301 | 297 | 284 |
| CE1 | E | — | — | 304 | 261 | 232 | 191 | 165 |
| CE3 | N | acetylene black HS100 | — | 271 | 156 | 113 | 0 | 0 |
| CE4 | L | acetylene black HS100 | triallyl cyanurate | 14 | 19 | 0 | 0 | 0 |

Acetylene black HS100 has a DBP oil absorption of 130 cc/100 g and is commercially available from Denki Kagaku K.K.
Ketjen black EC has a DBP oil absorption of 300 cc/100 g and is commercially available from Lion Yusi K.K.
Triallyl cyanurate is commercially available from Degussa Inc.
Aronix M309 is a trimethylolpropane acrylate commercially available from Toa Synthetic Chemical K.K.
Triallyl trimesate is commercially available from Tokyo Chemicals K.K.

As seen from Table 2, the cells of Examples 5 to 11 using electrode samples G to M within the scope of the present invention experienced a minimal loss of discharge capacity upon repetition of charge/discharge cycles. A comparison of the discharge capacity at the end of 20 charge/discharge cycles in Table 2, for example, reveals that the cells of Examples 5 to 11 using electrode samples G to M maintained a significantly improved discharge capacity over the cell of Comparative Example 1, indicating an improved cycle life. The cells of Comparative Examples 3 and 4 using electrode samples N and P had a low discharge capacity even at the end of one cycle.

The effectiveness of the invention is evident from these data.

Japanese Patent Application Nos. 353671/1993 and 353672/1993 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A secondary lithium cell comprising a negative electrode, a positive electrode and an electrolyte of a nonaqueous electrolyte solution containing a lithium salt, wherein at least one of said negative electrode and said positive electrode includes an electrode layer disposed on a current collector through an underlying layer, and said underlying layer being formed of a composition comprising from 10 to 200 parts by weight of carbon black having a DBP oil absorption of 100 to 500 cc/100 g, 100 parts by weight of a thermosetting polymer containing a fluorinated polymer and from 1 to 10 parts by weight of a crosslinking agent, said composition being a thermoset.

2. A secondary lithium cell comprising a negative electrode, a positive electrode and an electrolyte of a nonaqueous electrolyte solution containing a lithium salt, wherein at least one of said negative electrode and said positive electrode includes an electrode layer disposed on a current collector through an underlying layer, and said underlying layer being formed of a composition comprising from 10 to 200 parts by weight of carbon black having a DBP oil absorption of 100 to 500 cc/100 g and 100 parts of a radiation-curable polymer, said composition being radiation-cured.

3. The lithium secondary cell of claim 1 wherein said underlying layer has a thickness of 0.1 to 20 μm.

4. The lithium secondary cell of claim 1 wherein the composition of said underlying layer contains 100 parts by weight of the thermosetting polymer and about 1 to 15 parts by weight of an acid acceptor.

5. The lithium secondary cell of claim 2 wherein the composition of said underlying layer further includes a radiation-curable compound containing at least two groups each having a radiation-sensitive unsaturated double bond.

6. The lithium secondary cell of claim 5 wherein the group having a double bond is an allyl group of the formula:

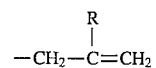

wherein R is hydrogen or fluorine.

7. The lithium secondary cell of claim 5 wherein the group having a double bond is an acryloyl group of the formula:

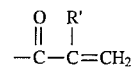

wherein R' is hydrogen, fluorine, an alkyl group or a fluoroalkyl group.

8. The lithium secondary cell of claim 5 wherein the composition of said underlying layer contains 100 parts by weight of the radiation-curable polymer and about 0.1 to 50 parts by weight of the radiation-curable compound.

9. The lithium secondary cell of claim 2 wherein the radiation-curable polymer in said underlying layer is a fluorinated resin.

10. The lithium secondary cell of claim 2 wherein said underlying layer has a thickness of 0.1 to 20 μm.

* * * * *